(12) United States Patent
Meeker

(10) Patent No.: US 8,898,432 B2
(45) Date of Patent: Nov. 25, 2014

(54) FOLDED SIMD ARRAY ORGANIZED IN GROUPS (PEGS) OF RESPECTIVE ARRAY SEGMENTS, CONTROL SIGNAL DISTRIBUTION LOGIC, AND LOCAL MEMORY

(75) Inventor: Woodrow L. Meeker, Orlando, FL (US)

(73) Assignee: Geo Semiconductor, Inc., Ontario (CA)

( * ) Notice: Subject to any disclaimer, the term of this patent is extended or adjusted under 35 U.S.C. 154(b) by 412 days.

(21) Appl. No.: 13/281,149

(22) Filed: Oct. 25, 2011

(65) Prior Publication Data

US 2013/0103925 A1    Apr. 25, 2013

(51) Int. Cl.
   *G06F 15/80* (2006.01)
   *G06F 9/06* (2006.01)
   *G06F 9/38* (2006.01)

(52) U.S. Cl.
   CPC .............. *G06F 9/06* (2013.01); *G06F 9/3887* (2013.01); *G06F 15/8023* (2013.01)
   USPC ............. 712/13; 712/11; 712/22; 712/E9.071

(58) Field of Classification Search
   CPC . G06F 9/3885; G06F 15/8007; G06F 9/3887; G06F 15/80; G06F 15/8023
   See application file for complete search history.

(56) References Cited

U.S. PATENT DOCUMENTS

| | | | |
|---|---|---|---|
| 3,537,074 A * | 10/1970 | Sankin et al. | 712/14 |
| 4,739,474 A | 4/1988 | Holsztynski | |
| 5,546,336 A * | 8/1996 | Pechanek et al. | 708/402 |
| 6,023,753 A * | 2/2000 | Pechanek et al. | 712/18 |
| 6,067,609 A | 5/2000 | Meeker et al. | |
| 6,073,185 A | 6/2000 | Meeker | |
| 6,173,388 B1 | 1/2001 | Abercrombie et al. | |
| 6,185,667 B1 | 2/2001 | Abercrombie et al. | |
| 7,000,090 B2 * | 2/2006 | Stein et al. | 712/22 |
| 7,133,998 B2 * | 11/2006 | Kirsch | 712/13 |
| 7,573,481 B2 | 8/2009 | Meeker | |
| 7,593,016 B2 | 9/2009 | Meeker | |
| 8,593,818 B2 * | 11/2013 | Jacquet | 361/748 |

* cited by examiner

*Primary Examiner* — Kenneth Kim
(74) *Attorney, Agent, or Firm* — Carl M. Napolitano; GrayRobinson, P.A.

(57) ABSTRACT

Systems and methods for folding a single instruction multiple data (SIMD) array include a newly defined processing element group (PEG) that allows interconnection of PEGs by abutment without requiring a row or column weave pattern. The interconnected PEGs form a SIMD array that is effectively folded at its center along the North-South axis, and may also be folded along the East-West axis. The folding of the array provides for north and south boundaries to be co-located and for east and west boundaries to be co-located. The co-location allows wrap-around connections to be done with a propagation distance reduced effectively to zero.

33 Claims, 19 Drawing Sheets

An Array of Layered PEGs  91

A) Pre-fold Quadrants 30

B) Folded and layered
Quadrants 40

Layered PEG 70                  PEGs within Folded SIMD Array 60

| PEG 5,0 | PEG 5,1 | PEG 5,2 | PEG 5,3 | PEG 5,4 | PEG 5,5 | PEG 5,6 | PEG 5,7 |
|---|---|---|---|---|---|---|---|
| PEG 4,0 | PEG 4,1 | PEG 4,2 | PEG 4,3 | PEG 4,4 | PEG 4,5 | PEG 4,6 | PEG 4,7 |
| PEG 3,0 | PEG 3,1 | PEG 3,2 | PEG 3,3 | PEG 3,4 | PEG 3,5 | PEG 3,6 | PEG 3,7 |
| PEG 2,0 | PEG 2,1 | PEG 2,2 | PEG 2,3 | PEG 2,4 | PEG 2,5 | PEG 2,6 | PEG 2,7 |
| PEG 1,0 | PEG 1,1 | PEG 1,2 | PEG 1,3 | PEG 1,4 | PEG 1,5 | PEG 1,6 | PEG 1,7 |
| PEG 0,0 | PEG 0,1 | PEG 0,2 | PEG 0,3 | PEG 0,4 | PEG 0,5 | PEG 0,6 | PEG 0,7 |

Location of PEG Quads in Logical Array

An Array of Layered PEGs  91

An Array of Layered PEGs 90

US 8,898,432 B2

FOLDED SIMD ARRAY ORGANIZED IN GROUPS (PEGS) OF RESPECTIVE ARRAY SEGMENTS, CONTROL SIGNAL DISTRIBUTION LOGIC, AND LOCAL MEMORY

FIELD OF THE INVENTION

The embodiments described herein relate generally to Single Instruction Multiple Data (SIMD) processors. In particular, the embodiments relate to fine-grain SIMD arrays that have mesh geometry and are employed in image processing or video applications.

BACKGROUND OF THE INVENTION

The legacy architecture to which the invention is applied includes SIMD processor arrays that are configured with a ring or a toroidal topology. In a rectangular SIMD array, the top (hereinafter also referred as north) and bottom (hereinafter also referred as south) boundaries are coupled to provide wrap-around in the North-South (NS) direction, and/or the right (hereinafter also referred as east) and left (hereinafter also referred as west) boundaries are coupled to provide wrap-around in the East-West (EW) direction. The purpose of this wrap-around is to allow processing with fewer edge effects, and on occasions to allow data that is shifted "off boundary" to be recovered. There are also algorithms, such as resampling, where shifting across a boundary provides a significant speedup.

Although it is difficult to quantify the improvement due to array wrap-around, programmers of the legacy architecture have traditionally insisted upon this feature as a necessary characteristic of the array. On the other hand, system implementation issues that arise from supporting this feature have been non-trivial. To avoid large propagation distances and loads for wrapped signals, it has been necessary (at both board and chip level) to interleave rows and columns of chips or of PE Groups (PEGs). This has led to very messy signal routing within board/chip layout solutions.

The present invention provides a solution, wherein a flat array is effectively "folded" to co-locate boundaries for making the wrap around connections. Yet further, a "Layered PEG" provides a building block for creating folded arrays.

SUMMARY OF THE INVENTION

Embodiments described herein provide in one aspect, a method for folding a SIMD array comprising a plurality of rows laid out in an East-West (EW) direction and North-South (NS) columns of processing elements (PE)s, wherein the method may comprise partitioning the SIMD array into an east half and a west half along the NS mid-axis of the array, reversing the physical orientation of the east half with respect to the orientation of the west half, physically co-locating logic of the east half and logic of the west half so that PEs of the east and west boundaries are located in proximity to each other, and PEs of the boundaries along the NS mid-axis partition are located in proximity to each other, and coupling the boundary signals at the east-west array boundaries and at the NS mid-axis partition, such that the array is configured in a ring topology and the boundary signals have minimal propagation distances.

The embodiments described herein provide in another aspect a method for folding a SIMD array in North-South direction in addition to the East-West direction.

The embodiments described herein provide in yet another aspect a system for folding a SIMD array comprising a plurality of rows laid out in an East-West (EW) direction, and North-South (NS) columns of Processing Elements (PE)s, wherein the system may comprise means for partitioning the SIMD array into an east half and a west half along the NS mid-axis of the array, means for reversing the physical orientation of the east half with respect to the orientation of the west half, means for physically co-locating logic of the east half and logic of the west half so that PEs of the east and west boundaries are located in proximity to each other, and PEs of the boundaries along the NS mid-axis partition are located in proximity to each other, and means for coupling the boundary signals at the east-west array boundaries and at the NS mid-axis partition such that the array is configured in a ring topology and the boundary signals have minimal propagation distances.

The embodiments described herein provide in another aspect a system for folding a SIMD array in North-South direction in addition to the East-West direction.

BRIEF DESCRIPTION OF THE DRAWINGS

For a better understanding of embodiments and/or related implementations described herein and to show more clearly how they may be carried into effect, reference will now be made, by way of example only, to the accompanying drawings. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. At least one exemplary embodiment and/or related implementation is illustrated in which.

DETAILED DESCRIPTION OF THE PREFERRED EMBODIMENTS

It will be appreciated that numerous specific details are set forth in order to provide a thorough understanding of the exemplary embodiments described herein. It will also be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

While the above description provides examples of the embodiments, it will be appreciated that some features and/or functions of the described embodiments are susceptible to modification without departing from the spirit and principles of operation of the invention and the described embodiments. Accordingly, what is described is intended to be illustrative of the invention and non-limiting and it will be understood by persons skilled in the art that other variants and modifications may be made without departing from the scope of the invention as defined in the claims appended hereto.

In particular, it should be understood that in what follows the directional terminology, e.g. east, west, north, south, horizontal and vertical, is merely used to better illustrate the otherwise conceptual aspects of the invention. They do not suggest actual geometrical coordinates. Other terminologies such as left-right-up-down, a numbering scheme, etc. could be used instead.

Figure 1:
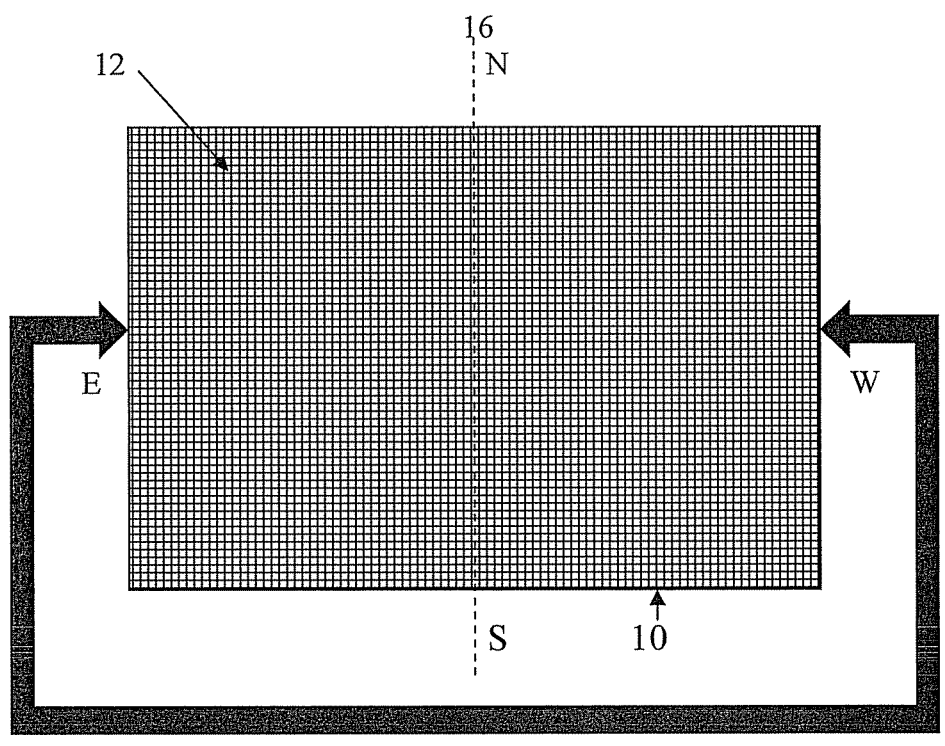
FIG. 1 illustrates a Processing Element (PE) array with East-West wrap-around.

Referring initially to FIG. 1, the usefulness of folding an array is illustrated as an exemplary Processing Element (PE) array 10 including 48 rows and 64 columns of PEs 12. Wrapping of array boundary signals in the East-West (EW) directions 14 is shown in FIG. 1. Similar wrapping could be applied in the North-South (NS) direction, depending on the application and structure of the array.

Figure 2A:
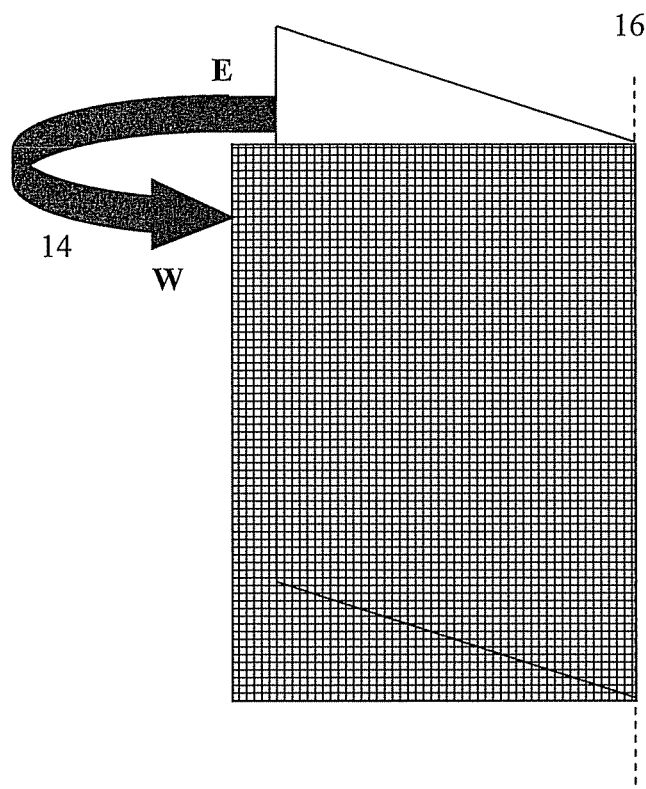
FIGS. 2A and 2B illustrate the folding process, wherein 2A: a PE array rearranged to align the east and west boundaries, and 2B: Partitioning at the mid axis, such that the array is effectively split in two array halves.

In accordance with one embodiment, it is possible to minimize long-distance propagation of signals between east and west boundaries by effectively "folding" the array, as illustrated in FIG. 2A. Specifically, the exemplary array of FIG. 1 is folded along the NS mid-axis 16 that splits the array into two equal halves, the east half 20 folding under the west half 21 in this example. Therefore, the east and west boundaries are co-located with respect to each other. In this configuration, the PEs at the east and west boundaries can be connected with minimal propagation of signals.

Figure 2B:
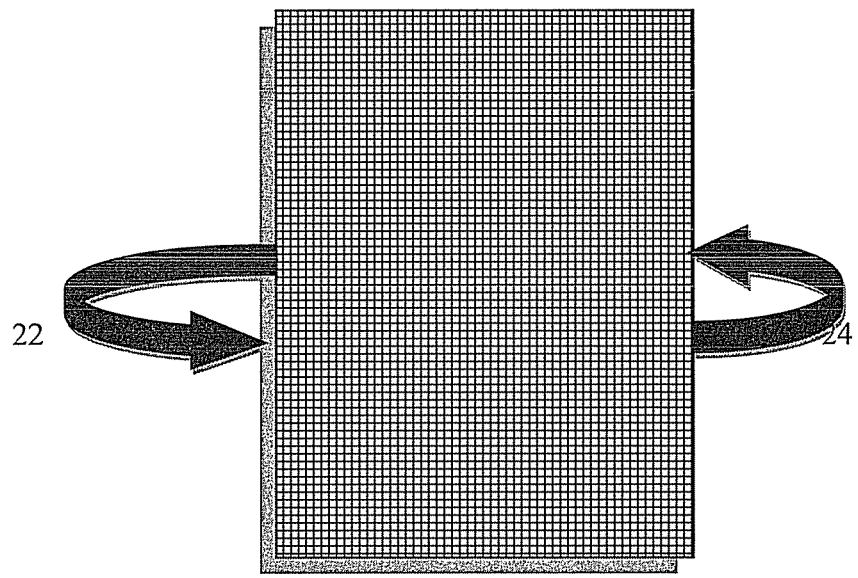

The array is then partitioned at the NS mid-axis 16. As such, there are two distinct array halves, the east half 20 effectively "upside down" below the west 21. The signal wrap-around is accomplished by coupling the boundary signals at and along the east and west boundaries 22 as well as at and along the mid-axis partition 24, as shown in FIG. 2B.

These connections maintain the PE-to-PE communications throughout, providing an equivalent ring topology for the wrapped array.

It is also possible to configure the logic for the PEs of east and west array halves in such a way that each PE of the west half is in proximity to a corresponding PE of the east half, and corresponding PEs are at the same East-West offset from the NS mid-axis, such that a reversal of array data about the NS mid-axis may be performed. This embodied byproduct of the folded array takes advantage of symmetry to achieve a reversal. This notion will be elaborated further in what follows.

Figure 3:
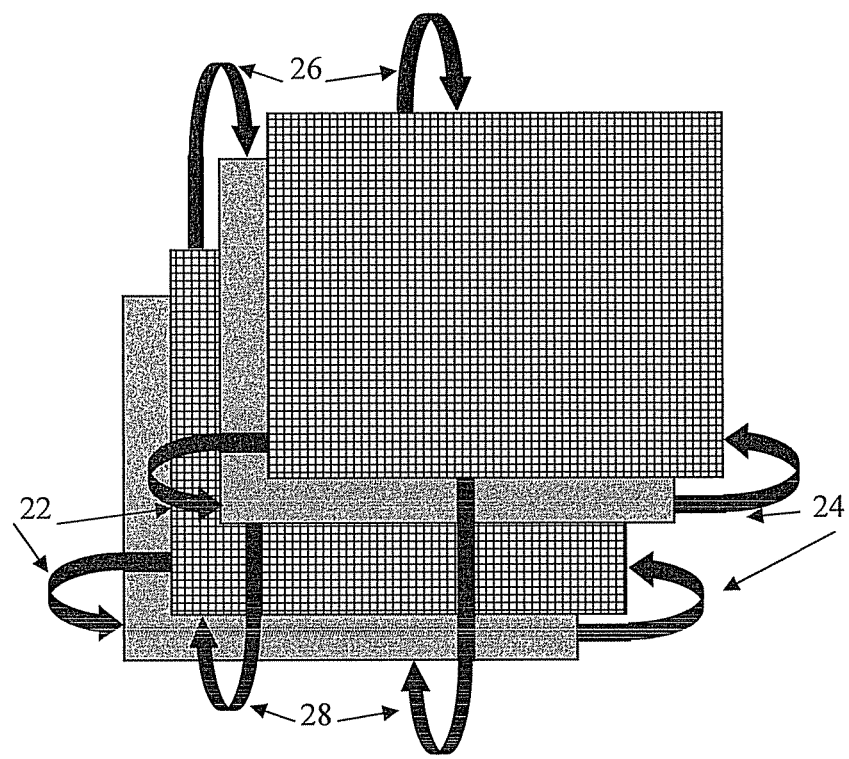
FIG. 3 illustrates a folded array using four array quadrants.

According to another embodiment of the invention, it is possible to extend the concept to a second folding, this time a North-South (NS) fold. The folded array is effectively folded again along the EW mid-axis, e.g. the south array half folding under the north, producing a folded array comprising 4 array quadrants as illustrated in FIG. 3. The NS signal wrap-around is accomplished by coupling the boundary signals at the NS boundaries 26 as well as at the EW mid-axis partition 28. With the addition of a second fold, the array can provide a toroidal topology (i.e. both NS and EW wrap-around) without requiring propagation of any boundary signals across a significant distance.

It should be noted that the described double folding is a commutative process, namely changing the order of folding direction would result in the same four quadrants. In other words, one could fold the SIMD array in the NS direction first followed by the NE fold.

Figure 4A:
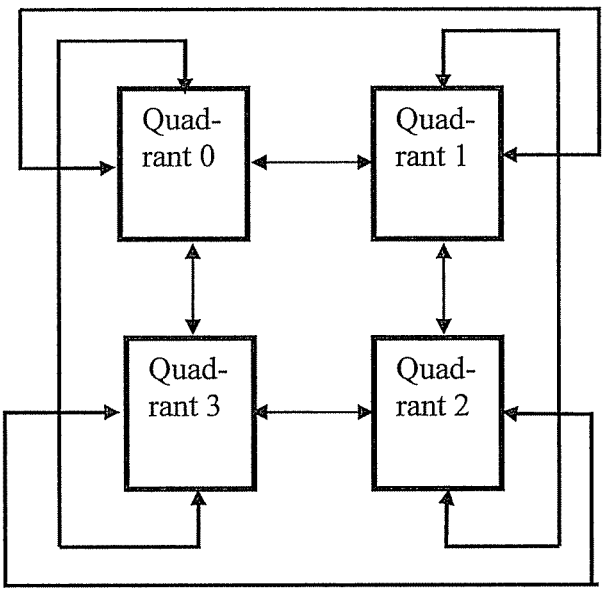
FIGS. 4A, 4B and 4C illustrate three configurations of four array quadrants: 4A) the preferred 2×2 toroidal, 4B) 4×1 coupled EW, and 4C) 1×4 coupled NS.
Figure 4B:
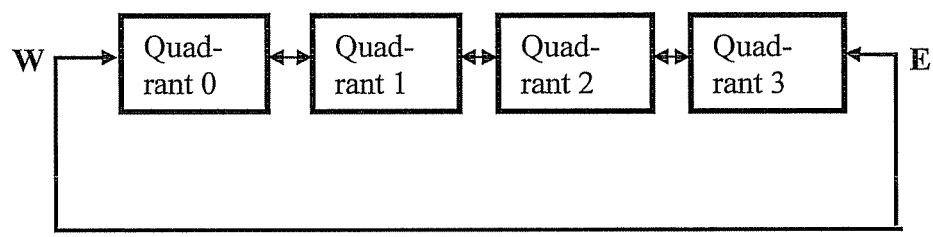
Figure 4C:
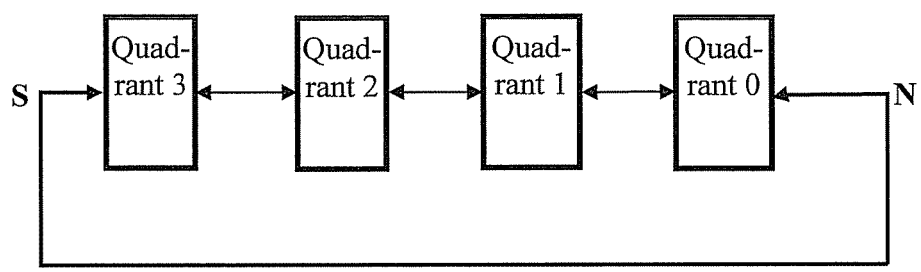

Partitioning of the SIMD array into four quadrants provides an additional feature; that is the ability to reconfigure the SIMD array to different dimensions. FIG. 4A shows a 2×2 arrangement of the coupling of quadrants as a torus (equivalent to FIG. 3). If the boundary connections were configurable, it would be possible to couple the array quadrants in different configurations to provide an array of different dimensions. For instance, by coupling the quadrants differently, arrays of 4×1 (FIG. 4B) or 1×4 (FIG. 4C) could be implemented. A limitation of this reconfiguration of the array however, is that wrapping around in one dimension only would be supported by the boundary connections of the quadrants. For the configuration of FIG. 4B, wrap-around in the E-W direction would still be provided, but N-S wraparound would be either omitted or provided by some other means. Similarly, the configuration of FIG. 4C would provide N-S wrap-around but no E-W wrap-around.

Figure 5:
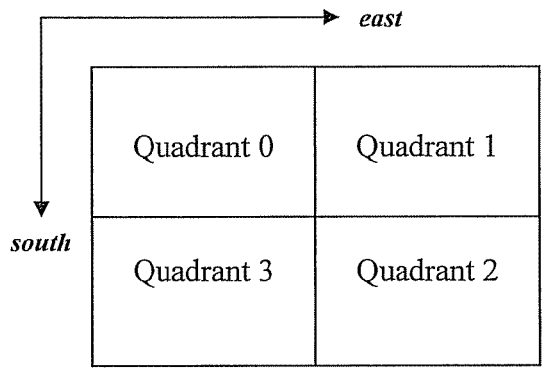
FIG. 5 illustrates array quadrants before (A) and after (B) folding.
Figure 5:
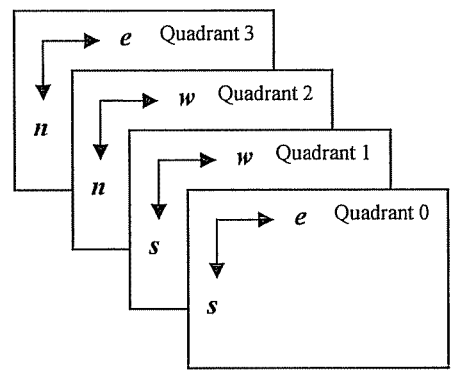

Referring now to FIG. 5, the conceptual 2-folding scheme employed in the exemplary embodiment of the invention is illustrated. The orientation of the quadrants (0-3) as shown in FIG. 5A prior to folding 30 is achieved by folding the east array half under the west, then by folding the south half under the north half. This scheme retains the upper left (NW) quadrant as Quadrant 0 with its original orientation intact so that all shift directions are unchanged.

The remaining quadrants after folding are layered as shown in FIG. 5B. The layering 40 is a physical co-location of quadrants with respect to each other such that the North-West corner of the Quadrant 0 is co-located with the North-East corner of Quadrant 1, the South-East corner of Quadrant 2 and the South-West corner of Quadrant 3.

It will be appreciated by those skilled in the art that a logical shift of data to the east in the array will cause the data to be physically shifted to the west within Quadrant 1, because that quadrant is folded under along the EW mid-axis. Similarly, a logical shift of data to the south will cause the data to be physically shifted to the north within Quadrant 3 because that quadrant is folded under along the NS mid-axis.

The orientation of each quadrant after folding is such that a logical array shift to the east causes a shift east for Quadrant 0 and Quadrant 3, and a shift west for Quadrant 1 and Quadrant 2. A logical array shift to the south causes a shift south for Quadrant 0 and Quadrant 1, and a shift north for Quadrant 2 and Quadrant 3.

Figure 6:
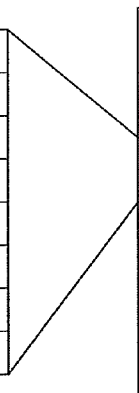
FIG. 6 illustrates an exemplary SIMD array comprising an 8×6 array of PE Groups (PEGs)

In one exemplary illustration of the embodiment as shown in FIG. 6, the flat SIMD array 50 comprises a 64×48 rectangular array of PEs 54. The PEs are organized into PE Groups (PEGs) 52, having a convenient dimension for the purpose of meeting design goals. The PEG organization allows PEs to be grouped together for the distribution of control signals and the sharing of memory resources. The exemplary flat PEG 52 comprises 64 PEs 54 arranged in an 8×8 grid.

Figures 7, 7A:
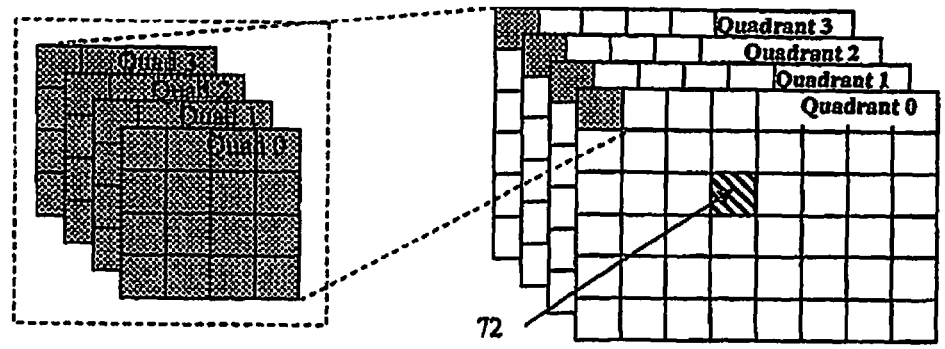
FIGS. 7 and 7A illustrate PE groups in a folded SIMD array.

FIG. 7 illustrates an exemplary flat SIMD array 50 as folded in accordance with the embodied double folding method. The folded array 60 is also comprised of PE Groups. However, since the array quadrants are co-located in the folded array, each PEG includes an array segment from every quadrant. Therefore, instead of a PEG comprising an 8×8 array of 64 PEs, the "layered PEG" 70 comprises four 4×4 arrays, one from each quadrant, as illustrated by FIG. 7.

Since the layered PEG 70 has 64 PEs, its physical size is virtually the same as that of the 8×8 flat PEG. The physical layout of layered PEGs to form a folded array is the same as the layout of flat PEGs in the flat array: the exemplary 64×48 SIMD array comprises an 8×6 array of PEGs in both cases, as illustrated with reference again to FIG. 6 and now to FIG. 7A.

One primary purpose of a 2-folded array is to provide East-West and North-South wrap-around at co-located boundaries without necessitating a complex PEG ordering or an unwieldy routing of signals between PEGs. The folded array scheme provides the co-location of boundary signals while allowing the straightforward placement and interconnection of PEGs.

Figure 8:
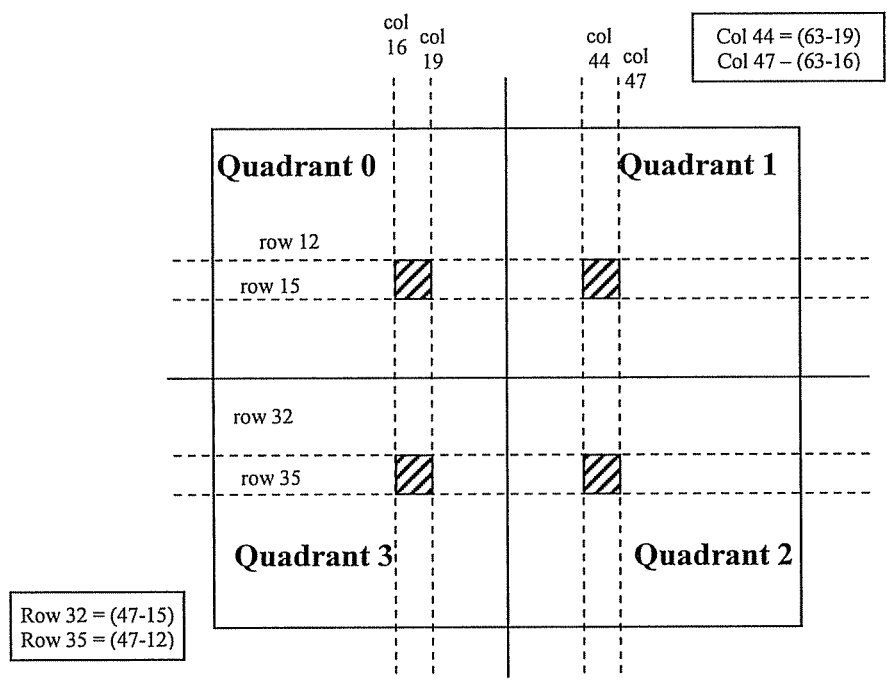
FIG. 8 illustrates PEG Quads in the Logical Array.

Similar to a single folded array, a double folded array has the image reversal (or flip) property. This feature may be understood by observing the manner in which array segments for each quadrant are grouped into PEGs. Consider, for example, the PEG 72 in the $3^{rd}$ row and $4^{th}$ column of the PEG array in FIG. 7. The array segments from each quadrant would be logically situated in an array as shown in FIG. 8. It is noted that "Logical Array" means array topology and behavior from the programmer's point of view, i.e. without regard to physical layout or implementation. A natural consequence of the folding paradigm is that each layered PEG comprises array segments that are symmetrically located with respect to each other about the N-S and E-W mid-axes of the logical array.

Since the array segments within each layered PEG (PEG Quads) are co-located, it is possible for the PEG to be configured so that these PEG quadrants may exchange data among themselves. This exchange among PEG quadrants is accomplished at minimum cost in area and in signal propagation. The exchange provides a means for performing an image reversal (i.e. a flip) in the array. The flip may be performed about either mid-axes, providing a North-south flip or an East-West flip. The flip is accomplished within a single cycle for each image bit-plane. (A "bit plane" is a 2-D array of single bit values, often representing a selected bit from each of a 2-D array of pixel values.)

The flip feature is quite useful wherever an image reversal is desired. This may include certain transformation operations. The flip is also occasionally useful for quickly routing data across the array. For example, the flip provides a means for quickly calculating an array sum.

Figure 9A:
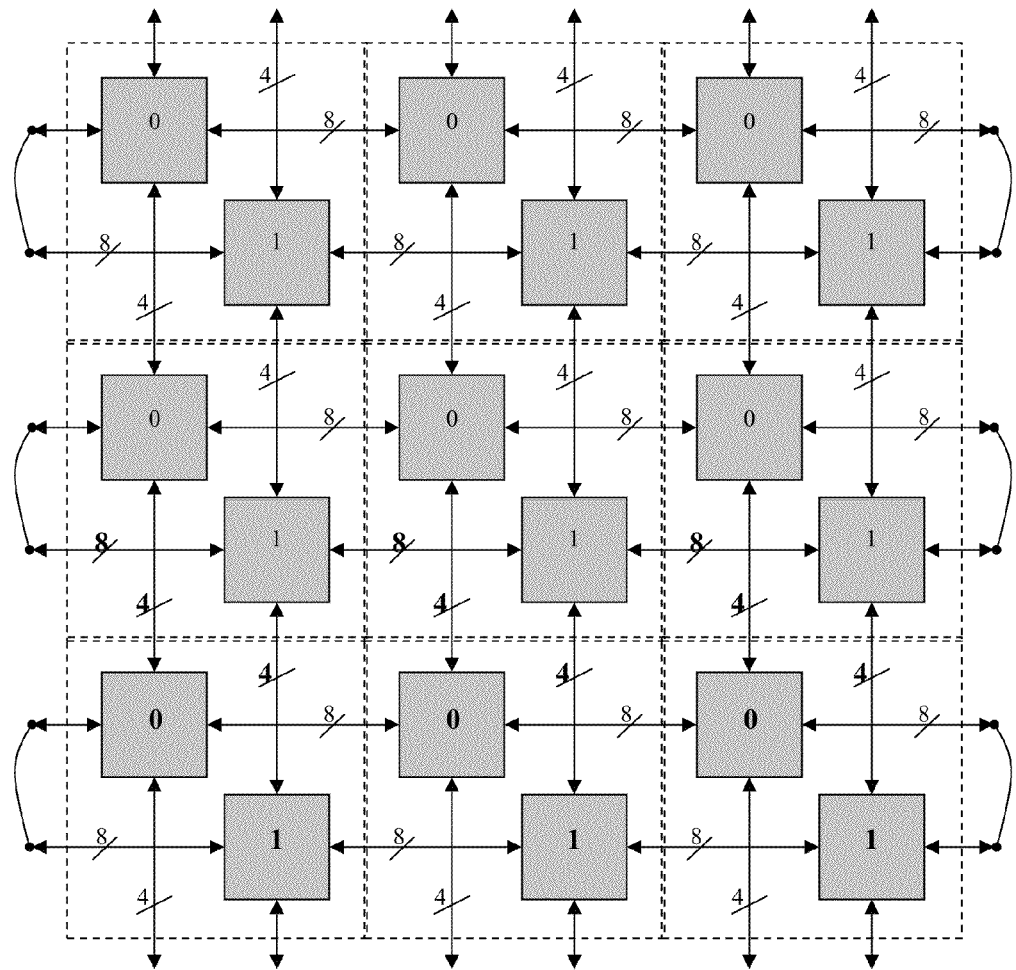
FIG. 9A illustrates a 24×24 array created from Layered PEGs, with an East-West (EW) wrap, for an exemplary case wherein the array segments comprising the PEG are each 8 rows by 4 columns.

FIG. 9A illustrates how a single-folded array may be constructed by interconnecting a rectangular array of layered PEGs 91. In contrast to a 2-folded array, each PEG comprising a single-folded array includes 2 array segments. The PEGs are interconnected so that each PEG segment is connected to a corresponding segment of each neighboring PEG. As used consistently throughout the drawing illustrations and description, interconnecting lines illustrate a direct connection between components and crossing lines or wires do not illustrate physical or functional connection unless designated by a dot as a connector. The interconnected PEG segments for a given layer comprise an array half.

Figure 9B:
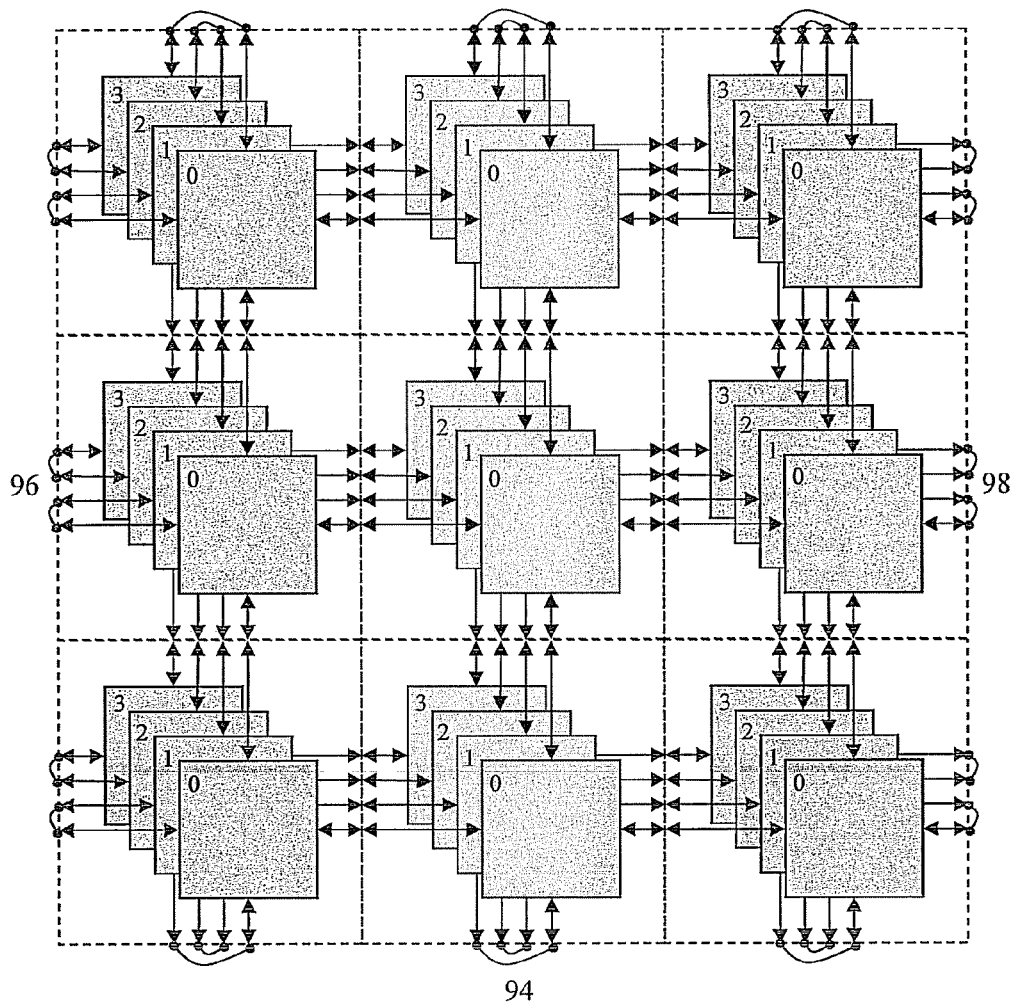
FIG. 9B illustrates a 24×24 Array created from Layered Pegs, with North-South (NS) and East-West (EW) wrap, for an exemplary case wherein all signal paths are O-bit.

FIG. 9B illustrates how the 2-folded array may be constructed by interconnecting a rectangular array of layered PEGs 90. The PEGs are interconnected so that each PEG quadrant is connected to the corresponding quadrant of each of the 2 to 4 (depending on the position of the PEG in the array) neighboring PEGs. The interconnected PEG quadrants for a given layer comprise an array quadrant.

The array quadrants are coupled to form a wrapped around array by making appropriate connections at the boundaries of the PEG array (FIG. 9). Quadrants 0 and 3 are coupled at the north 92 and south 94 array boundaries, as are Quadrants 1 and 2. On the east 96 and west 98 array boundaries, Quadrants 0 and 1 are coupled, as are Quadrants 2 and 3. This coupling of quadrants at the boundaries provides the necessary interconnection of array quadrants to form a wrapped around array that provides the desired toroidal topology.

FIG. 9 further confirms that a shift of data to the east in Quadrant 0 will lead to a corresponding shift of data to the west in Quadrant 1. This is true because of the topology as previously described, but one may also note that data shifting out of the Quadrant 0 boundary on the east must shift into the Quadrant 1 boundary on the east. This means Quadrant 1 is necessarily shifting west.

Within the PEG, Quadrants 0, 1 and Quadrants 2, 3 shift in opposite directions EW. Similarly, Quadrants 0, 3 and Quadrants 1, 2 shift in opposite directions NS. It should also be apparent that Quadrants 0, 3 and Quadrants 1, 2 shift the same directions EW while Quadrants 0, 1 and Quadrants 2, 3 shift the same directions NS. Internal layered PEG shifts with respect to array shifts are summarized in Table 1.

TABLE 1

| Direction of Internal PEG Quadrant Shifts | | | | |
| --- | --- | --- | --- | --- |
| Array shift | N | S | E | W |
| Quadrant 0 shift | N | S | E | W |
| Quadrant 1 shift | N | S | W | E |
| Quadrant 2 shift | S | N | E | W |
| Quadrant 3 shift | S | N | W | E |

A further consideration of reconfiguring the array (as elaborated in relation to FIG. 4) is the control of each quadrant for bit plane shifting. Table 1 illustrates the physical shift direction for each PEG quadrant with respect to the Array Shift direction for a toroidal configuration (FIG. 4A). If the SIMD array is reconfigured, e.g. in accordance with FIGS. 4B and 4C, the shift directions for each PEG quad will be as shown in Table 2 (4×1 configuration) and table 3 (1×4 Configuration) respectively. Accordingly, the response of each quadrant could be varied to shift instructions based on the configuration selected.

TABLE 2

| Array shift | N | S | E | W |
| --- | --- | --- | --- | --- |
| Quadrant 0 shift | N | S | E | W |
| Quadrant 1 shift | N | S | W | E |
| Quadrant 2 shift | N | S | E | W |
| Quadrant 3 shift | N | S | W | E |

TABLE 3

| Array shift | N | S | E | W |
| --- | --- | --- | --- | --- |
| Quadrant 0 shift | N | S | E | W |
| Quadrant 1 shift | S | N | E | W |
| Quadrant 2 shift | N | S | E | W |
| Quadrant 3 shift | S | N | E | W |

A layered PEG, as described, differs from a flat PEG in two significant ways. First, the layered PEG is effectively partitioned into 4 quadrants with implications for data shifting that will be described in more detail below. Second, the interconnection of the 4 quadrants with quadrants in neighboring PEGs requires twice as many signals (64 in this example) as required for the exemplary flat PEG (32 signals). Apart from these considerations, the layered PEG is virtually identical to the flat PEG in implementation.

Figure 10:
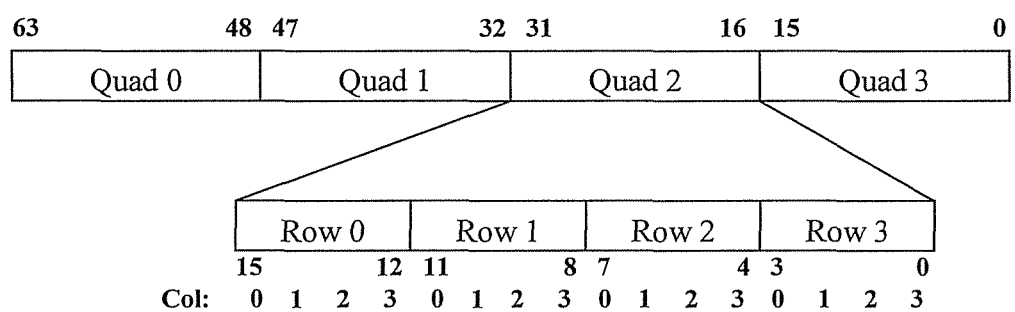
FIG. 10 illustrates an exemplary mapping of PEG Word (e.g. PE Ram data) to Quadrants, Rows and Columns.

Within the layered PEG, the physical PE Ram is 64-bit in width, with each bit of Ram data coupled to one PE. The assignment of Ram data bits by quad, row and column is shown in FIG. 10. Quadrants are assigned to the Ram data word in MSB (Most Significant Bit) to LSB (Least Significant Bit) order from Quadrant 0 to Quadrant 3. Within each quadrant, the assignment of PEs proceeds in raster order from MSB to LSB. In other words, the North-West (upper left) corner of a quadrant is the MSB of that quadrant's field of the Ram data word. In this description of PE Ram data word mapping, rows and columns are defined as: Row 0 is "top" row, Col. 0 is "left" column. This definition applies to all quadrants, describing in effect the physical location of each PE.

Figure 11:
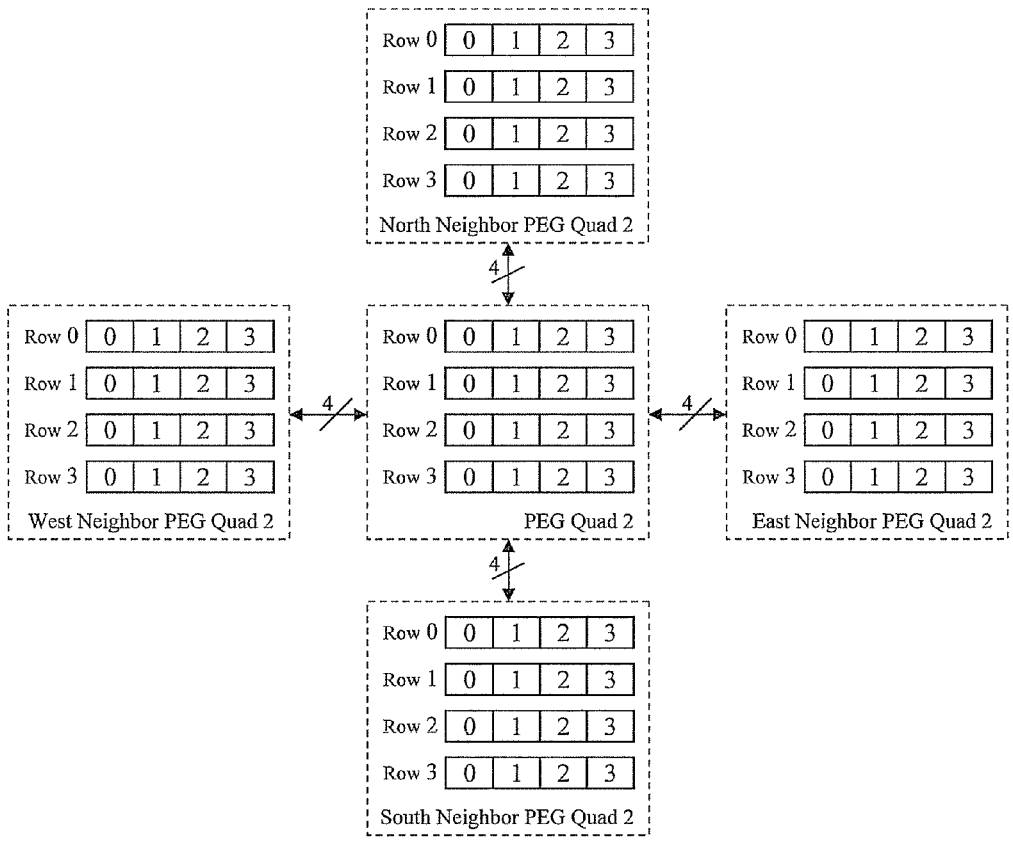
FIG. 11 illustrates the movement of data within the PEG.

The movement of data within the PEG with respect to bit plane shifts will now be described for Quadrant 2 as shown in FIGS. 10 and 11. A north shift is accomplished by shifting each row to the next lower numbered row within the quadrant. The Row 0 data is shifted from the PEG to the Quadrant 2 input for the PEG located to the north. The Row 3 data is shifted in from the PEG located to the south.

A south shift is accomplished by shifting each row to the next higher numbered row within the quad. The Row 3 data is shifted from the PEG to the Quadrant 2 input for the PEG located to the south. The Row 0 data is shifted in from the PEG located to the north.

A west shift is accomplished by shifting data within each row to the next lower numbered bit. The bit 0 data for the 4 rows is shifted from the PEG to the Quadrant 2 input for the PEG located to the west. The bit 3 data for the 4 rows is shifted in from the PEG located to the east.

An east shift is accomplished by shifting data within each row to the next higher numbered bit. The bit 3 data for the 4 rows is shifted from the PEG to the Quadrant 2 input for the PEG located to the east. The bit 0 data for the 4 rows is shifted in from the PEG located to the west.

Figure 12:
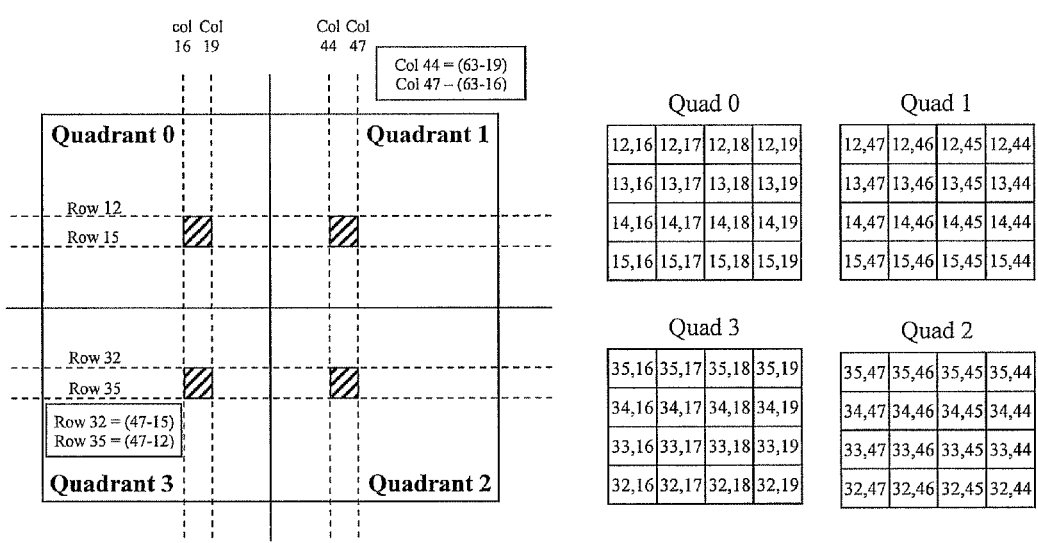
FIG. 12 illustrates an exemplary mapping of array PEs to Layered PEG PEs (PEG Row=3, PEG Col=4)

To determine the subframe pixels stored within a given PEG, consider again the example of FIG. 8, where the selected PEG 72 is located in PEG Row 3 (numbering from 0) and PEG column 4. The pixels comprising Quadrant 0 of the PEG are determined to be: rows 3*4 . . . 3*4+3 (12 . . . 15) and columns 4*4 . . . 4*4+3 (16 . . . 19). The pixels comprising Quadrant 0 are shown in FIG. 12.

The pixels comprising the other 3 quadrants are computed by recognizing that the quadrants represent array segments that are situated symmetrically with respect to each other across the array mid-axes. The pixels comprising Quadrant 1 would therefore be the same row numbers as for Quadrant 0. However, the column numbers would be computed by subtracting the Quadrant 0 column numbers from 63 (as shown in the right half of FIG. 12). Similarly, the row numbers for Quadrant 3 would have the same column numbers as Quadrant 0 but would have row numbers that could be determined by subtracting the Quadrant 0 row from 47. Quadrant 2 row and column numbers would be computed by applying the subtraction rule for both rows and columns.

Figure 13:
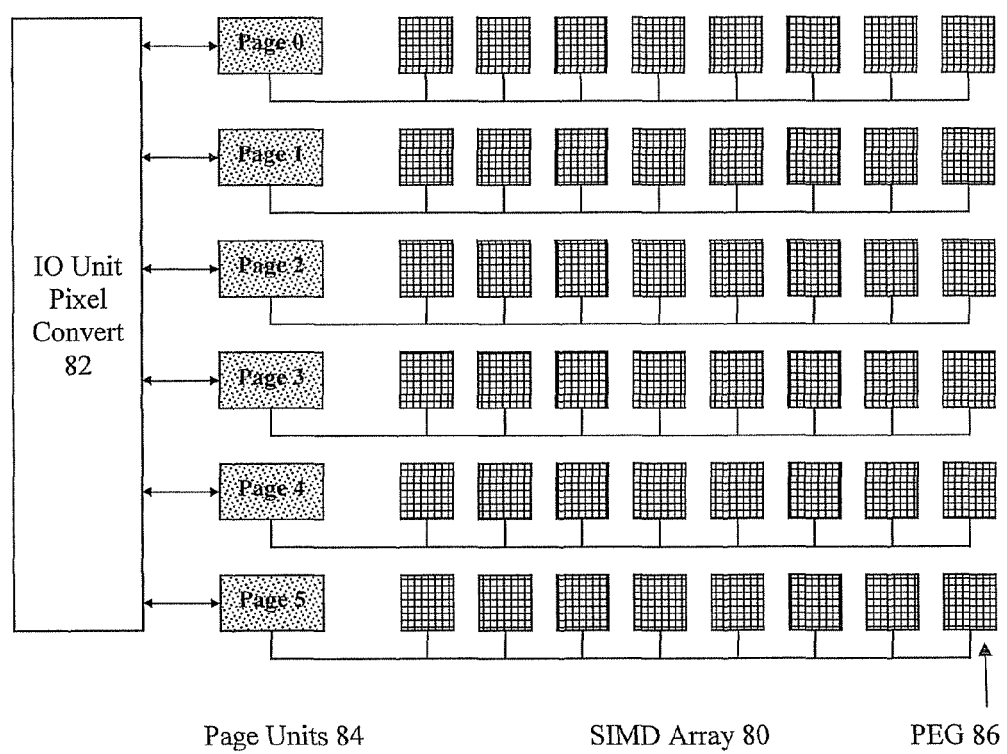
FIG. 13 illustrates the connection of Page Units to PEG Rows.

The exemplary SIMD array can also provide a means for input and output of subframe pixel data, as illustrated in FIG. 13. An Input/Output (I/O) Unit 82 provides communication of pixel data between the SIMD array 80 and external logic. The I/O unit 82 can transfer array data using a row and column ordering that corresponds to the arrangement of PEs in the folded array. The I/O Unit 82 further performs a conversion of the subframe data between pixel and bit plane forms. Input and Output of subframe data with the SIMD Array occurs via 6 Page Units 84 in the exemplary embodiment, one Page Unit for each PEG row.

The Page Units 84 provide "Page Ram" for temporary storage of subframe data during input or output. This secondary storage can also function as a repository for array data, effectively increasing the storage capacity of the SIMD Array. The width of each Page Unit in the exemplary embodiment is 64 bits. The Page Ram within the unit has a width of 64 bits, and the input and output data path between the Page Unit and the array is 64-bit. The 64-bit data path is distributed so that an 8 bit data path is coupled to each of the PEGs 86 in the PEG row.

The SIMD Array 80 is configured to provide paging of subframe data (between PEGs 86 and Page Units 84) concurrently with other processing that the PEGs may be performing. To that end, a bit plane resource entitled the "CM Plane" is provided to shift bit plane data in or out of the PEGs. Each PEG 86 comprises an 8×8 CM Plane configured to store one bit plane of data during paging. To page data into the array, the Page Unit 84 reads 8 bit lines of data from Page Ram in sequence, and shifts them into the CM Planes of the PEGs. To page data out of the array, the CM Planes shift the bit lines out to the Page Unit, where the data is written to Page Ram in sequence.

Figure 14:
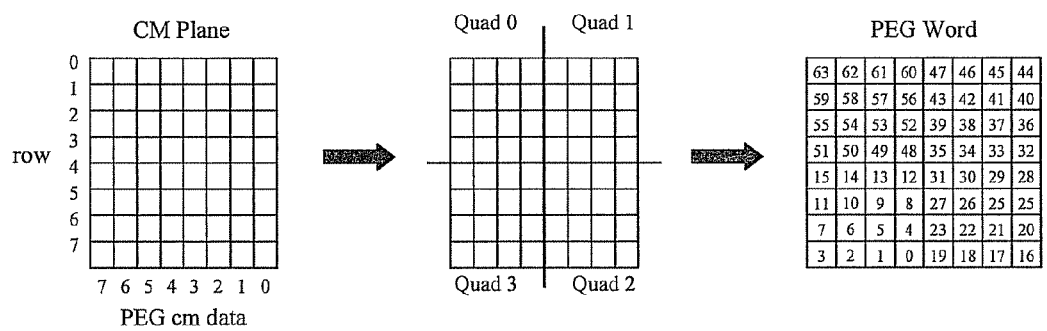
FIG. 14 illustrates mapping of CM plane data to the PEG Word.

The 8-bit CM data word is mapped to the PEG as shown in FIG. 14, where the most significant CM bit is the left-most column and the least significant CM bit is the right-most column. The CM plane is mapped to the PEG quadrants and to the PEG word (see also FIG. 10) as shown in FIG. 14.

Figure 15:
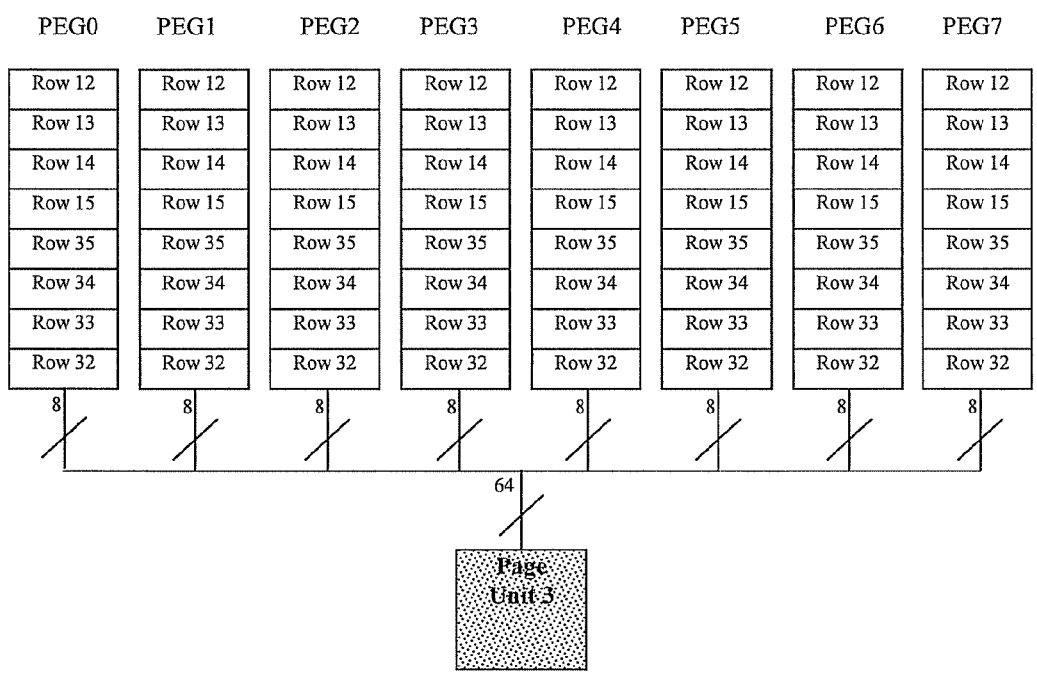
FIG. 15 illustrates movement of CM Plane Data between Page Unit and PEGs.

The subframe data is stored in the Page Unit in bit line form. A "bit line" is one row of a bit plane. The rows comprising PEG Row 3, for example, are rows 12 . . . 15 and rows 32 . . . 35 (see FIG. 12). The bit lines comprising these rows would be shifted in or out of the PEG row as shown in FIG. 15. Each bit line is 64 bits in width and is stored as a unique word in the 64-bit Page Ram. The ordering of the rows, as shown in FIG. 15, is provided by accessing the bit lines in the Page Ram in the proper sequence.

Figure 16:
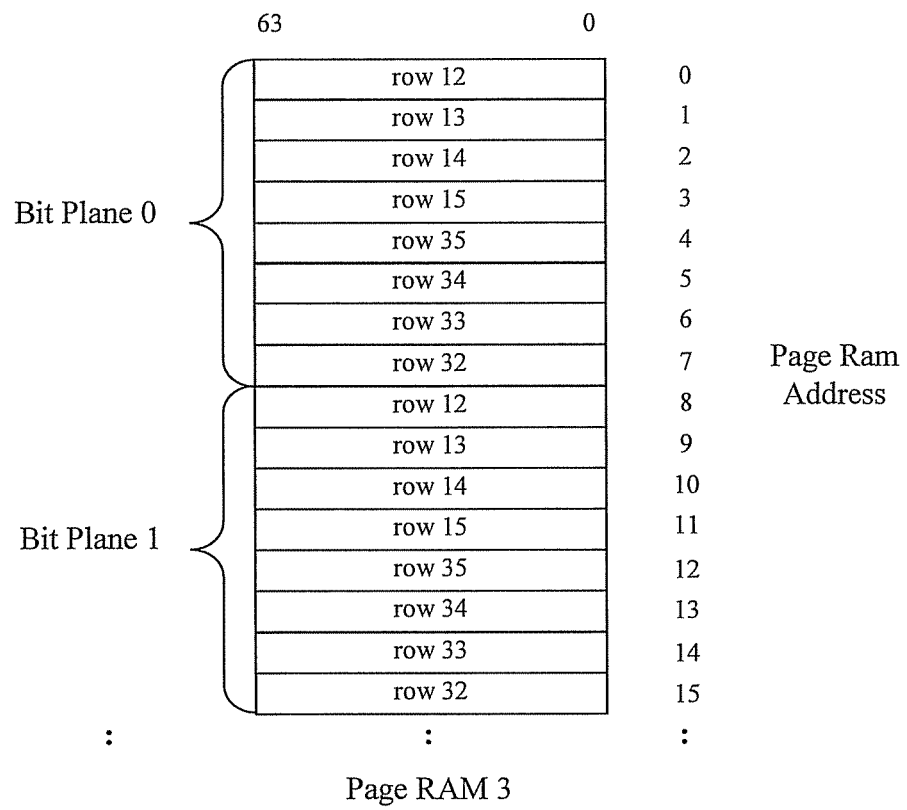
FIG. 16 illustrates Bit Line Storage in the Page Ram for a exemplary case wherein Page Unit=3.

To facilitate the movement of subframe data described above, the storage of the rows within Page Ram is as shown in FIG. 16 (where 0 is the base address for the subframe). This allows the proper row sequence to be achieved with sequential accesses to Page Ram. This ordering of data is provided by controlling the Page Ram address sequence during data transfers between the Page Ram and the I/O Unit 82. In another embodiment, the Page Ram data could be stored in sequential row order and the desired row sequence provided by addressing the Page Ram in the proper order during paging.

The order in which bit lines are stored in Page Ram has further implications for the distribution of bit line data from the I/O Unit 82 to the individual Page Units. In previous embodiments (using a flat array), the receiving and reformatting of pixel data in the I/O Unit 82 was done in increments of one pixel line. After a pixel line was received, all bit lines for that pixel line would be distributed to the Page Unit corresponding to the pixel row. To minimize the amount of buffering required in the Page Units 84 and maximize the concurrency of the logic, pixel rows were accessed (to/from external storage) in a pattern of skipping by 8 lines. In this manner a pixel row would be processed and sent to a Page Unit. The next pixel row processed would be 8 rows further in the image, allowing the next processed pixel row to be sent to the next Page Unit.

The exemplary embodiment retains the pattern of skipping-by-8 rows for sending or receiving pixel data by the I/O Unit 82. Because of the array folding, this means that for all rows whose number modulus 8 is 0, 1, 2 or 3, the order in which Page Units will be accessed is 0, 2, 4, 5, 3, 1. For all rows whose number modulus 8 is 4, 5, 6 or 7, the order in which Page Units 84 will be accessed is 1, 3, 5, 4, 2, 0.

Figure 17:
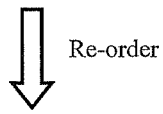
FIG. 17 illustrates mapping of Page Ram Data to Layered PEG CM Ports.

The subframe data in Page Ram is stored in bit line form. (A bit line comprises one bit from each pixel across one row of the SIMD Array.) The Page Ram data bits are stored in pixel column order as shown in FIG. 17. The pixel numbers range from 0 to 63 in the reverse of the Page Ram bit order.

For a flat SIMD array, the Page Ram data may be distributed to each PEG row with no re-ordering. The implications of the array folding on the Page Ram bit ordering may be seen by observing the PEG Inputs in FIG. 17. As an example, consider that Pixel 0 would be coupled to PEG 0, bit 7, the left most bit for Quadrant 0 and 3. Pixel 63, on the other hand would be coupled to the left most bit for Quadrant 1 and 2 for the same PEG. In general one can observe that PEG Input bits for the first 32 pixels are distributed to the 8 PEGs in ascending order while the PEG Input bits for the second 32 pixels are distributed to the 8 PEGs in descending order. The PEG Input bits for the first 32 pixels are distributed to Quadrant 0 and 3 (bits 7, 6, 5, 4) while the PEG Input bits for the second 32 pixels are distributed to Quadrant 1 and 2 (bits 0, 1, 2, 3). The bit order for the second 32 PEG Inputs is reversed reflecting the fact that Quadrants 1 and 2 are "folded under" east-to-west. The re-ordering of the PEG Inputs for distribution to the PEG row is shown at the bottom of FIG. 17.

Figure 18:
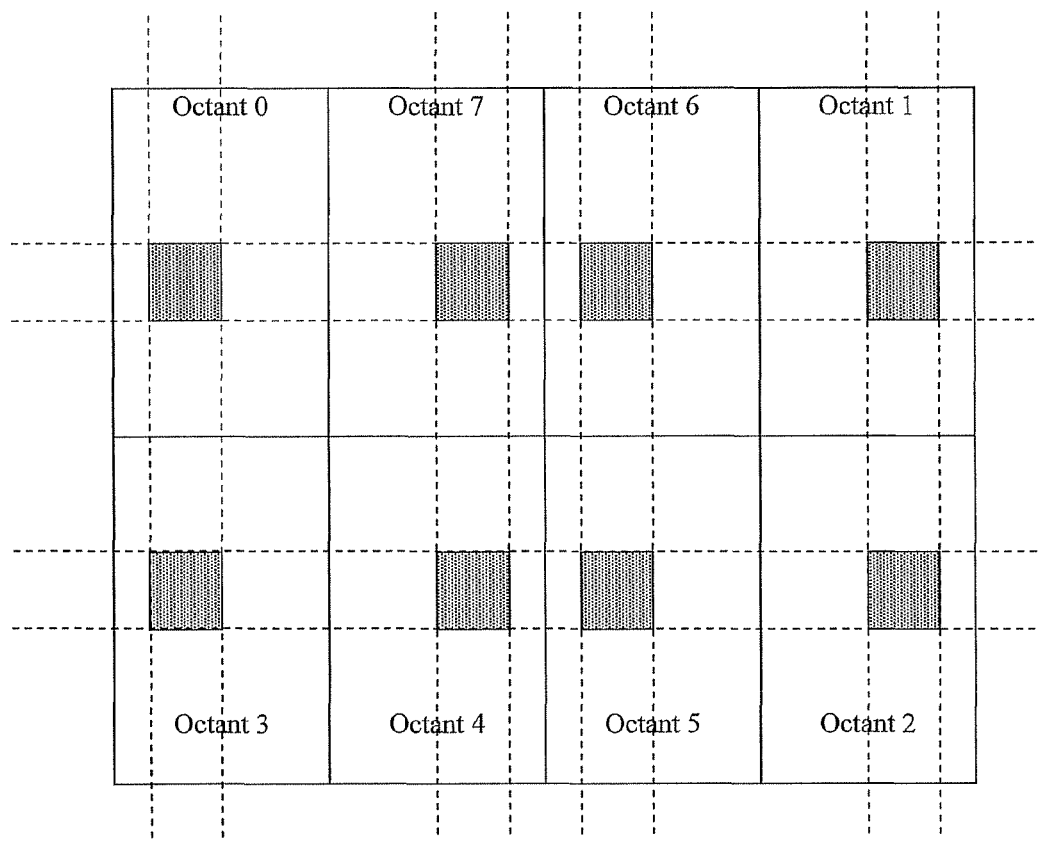
FIG. 18 illustrates a SIMD Array 3-folded into Octants.

Although the embodiments of this invention have taught single and double folding of SIMD arrays by way of examples, it would be natural for a person skilled in the art to employ those techniques to explore the possibilities afforded by applying additional folds to a SIMD array. In one exemplary embodiment, an array was folded once EW and once NS. This 2-folded array could be folded an additional time in the EW direction. The SIMD array would then comprise 8 octants as shown in FIG. 18. Accordingly, each PEG will now comprise 8 array segments, the segments being situated symmetrically about the fold axes. The details of PEG implementation, shift directions, I/O mapping, and boundary connections could be determined in a manner similar to the 2-folded array previously described.

A 3-folded array would provide useful capabilities. The image reversal (flip) capability would be enhanced such that reversals between octant pairs are performed. In this manner, each fold provides an additional power-of-2 partitioning of the array for performing image translations. This is a useful feature for supporting transform algorithms as well as algorithms that require movement of data across major portions of the array.

Further, reconfigurability would also be enhanced by additional folding of the array. The 8 octants could be arranged as 4×2 (as shown in FIG. 18), or as 2×4, 1×8, or 8×1 (not shown, but same idea as FIG. 4). Full array wrap-around in NS and EW directions could be supported for either 4×2 or 2×4 configurations.

Yet further, the array folding process may be carried out to extreme cases, e.g. 4-fold, 8-fold, etc., shall applications arise. However the drawback is each fold of the array increases the number of signals required between PEGs. Increased signals means increased die area on the chip, so that the folding process will be carried out only as long as an increase in performance due to folding justifies the additional area.

The present invention has provided a folding technique to create a SIMD array architecture that allows boundary PEs to be co-located so that wrap around signal connections may be made with minimal signal propagation. The solution mitigates the need for complex and less efficient techniques such as weaving of PEG rows and columns. The resulting architecture provides other features, such as reversal of image segments about each axis of folding and a means for creating reconfigurable SIMD arrays. The specification further provides enabling teaching about the implications of folding on PEG implementation and I/O logic for moving data between the SIMD array and associated Page Ram.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

That which is claimed is:

1. A method for folding a SIMD array, the SIMD array having a plurality of rows laid out in an East-West (EW) direction, and North-South (NS) columns of processing elements (PEs), the method comprising:
   logically partitioning the SIMD array into an east half and a west half;
   organizing the PEs into a plurality of PE Groups (PEGs), wherein each PEG comprises:
      a first plurality of PEs comprising a first array segment logically configured as a rectangular segment of PEs from the east half of the SIMD array;
      a second plurality of PEs comprising a second array segment logically configured as a rectangular segment of PEs from the west half of the SIMD array;
      logic for receiving and distributing control signals to the PEs; and
      RAM memory blocks configured to read and write PE data; and
   physically arranging the PEGs in a grid and interconnecting adjacent PEGs to form a folded SIMD array.

2. The method of claim 1, further comprising wrapping the SIMD array around in the EW direction by coupling boundary signals at EW array boundaries and at a NS mid-axis partition, and wherein the SIMD array is configured in a ring topology and the boundary signals have minimal propagation distances.

3. The method of claim 1, further comprising:
folding the SIMD array in a NS direction, and partitioning the SIMD array into a north half and a south half, each half having an east quadrant and a west quadrant; and
reconfiguring the PEG to comprise four array segments, wherein each segment is logically configured as a rectangular segment of PEs from a corresponding quadrant of the folded SIMD array.

4. The method of claim 3, further comprising reconfiguring the SIMD array to different dimensions by configuring boundary connections of four quadrants.

5. The method of claim 3, further comprising wrapping the SIMD array around in both the NS and EW directions by coupling boundary signals at NS array boundaries and at an EW mid-axis partition, and coupling boundary signals at EW array boundaries and at a NS mid-axis partition, and wherein the array is configured in a torus topology and the boundary signals have minimal propagation distances.

6. The method of claim 3, further comprising coupling the PEs for a given quadrant of each PEG to the PEs of the same quadrant in neighboring PEGs.

7. The method of claim 3, further comprising configuring each array segment to provide shifting as required by an orientation of a corresponding quadrant within the folded SIMD array such that a consistent logical array shift is performed by the array quadrants.

8. The method of claim 3, further comprising configuring the logic for the four array quadrants so that each PE of a given quadrant is in proximity to corresponding PEs of the other three quadrants, and the corresponding PEs have an identical EW offset from a NS mid-axis, and wherein a reversal of array data about the NS mid-axis may be performed.

9. The method of claim 3, further comprising configuring the logic for the four array quadrants so that each PE of a given quadrant is in proximity to corresponding PEs of the other three quadrants, and corresponding PEs have an identical NS offset from an EW mid-axis, and wherein a reversal of array data about the EW mid-axis may be performed.

10. The method of claim 3, wherein the SIMD array further comprises an input/output (I/O) unit, and wherein the method comprises configuring the I/O unit for transferring array data using a row and column ordering that corresponds to the arrangement of PEs in the folded SIMD array.

11. The method of claim 10, wherein the transferring of array data occurs via a plurality of page units, and wherein there is one page unit for each row of PEGs.

12. The method of claim 3, further comprising repeating the folding and reconfiguring steps for reconfiguring the array into additional size configurations and for performing reversals on partial array segments.

13. The method of claim 1, further comprising configuring the logic for the east and west array half PEs so that each PE of the west half is in proximity to a corresponding PE of the east half, and corresponding PEs have an identical EW offset from a NS mid-axis, wherein a reversal of array data about the NS mid-axis may be performed.

14. The method of claim 1, further comprising coupling the east half PEs of each PEG via signals on the PEG periphery to east half PEs of neighboring PEGs and coupling the west half PEs of each PEG to the west half PEs of the neighboring PEGs.

15. The method of claim 1, further comprising configuring each array segment to provide shifting as required by an orientation of a corresponding array half within the folded SIMD array such that a consistent logical array shift is performed by the array halves.

16. The method in claim 1, wherein the SIMD array further comprises an input/output (I/O) unit, and wherein the method comprises configuring the I/O unit to transfer array data using a column ordering that corresponds to the arrangement of PEs in the folded SIMD array.

17. The method of claim 1, further comprising repeating the steps for reconfiguring the SIMD array into additional size configurations.

18. The method of claim 1, further comprising repeating the steps for performing reversals on partial array segments.

19. A folded SIMD array comprising:
a plurality of Processing Elements (PEs) laid out in rows in an East-West (EW) direction and in columns in a North-South (NS) direction,
wherein the SIMD array is partitioned into an east half and a west half,
wherein the PEs are organized into a plurality of PE Groups (PEGs), the PEGs arranged in a grid and adjacent PEGs are interconnected to form the folded SIMD array, and wherein each PEG comprises:
a first plurality of PEs comprising a first array segment logically configured as a rectangular segment of PEs from the east half of the SIMD array;
a second plurality of PEs comprising a second array segment logically configured as a rectangular segment of PEs from the west half of the SIMD array;
logic for receiving and distributing control signals to the PEs; and
RAM memory blocks configured to read and write PE data.

20. The SIMD array of claim 19, wherein the SIMD array is wrapped around in the EW direction, and comprises means for coupling boundary signals at EW array boundaries and at a NS mid-axis partition, and wherein the SIMD array is configured in a ring topology and the boundary signals have minimal propagation distances.

21. The SIMD array of claim 19, comprising the SIMD array folded in a NS direction, wherein the SIMD array is further partitioned into a north half and a south half, each half having an east quadrant and a west quadrant, and wherein the PEG is configured to comprise four array segments with each segment logically configured as a rectangular segment of PEs from a corresponding quadrant of the SIMD array.

22. The SIMD array of claim 21, wherein the SIMD array is wrapped around in the NS and EW directions, and comprises means for coupling boundary signals at NS array boundaries and at an EW mid-axis partition, and means for coupling boundary signals at EW boundaries and at a NS mid-axis partition, and wherein the SIMD array is configured in a torus topology and the boundary signals have minimal propagation distances.

23. The SIMD array of claim 21, comprising means to reconfigure the SIMD array to different dimensions by configuring boundary connections of the four quadrants.

24. The SIMD array of claim 21, wherein the PEs for a given quadrant of each PEG are coupled to the PEs of the same quadrant in neighboring PEGs.

25. The SIMD array of claim 21, wherein each array segment is configured to provide shifting as required by an orientation of a corresponding quadrant within the folded SIMD array such that a consistent logical array shift is performed by the array quadrants.

26. The SIMD array of claim 21, wherein the logic for the four array quadrants is configured such that each PE of a given quadrant is in proximity to corresponding PEs of the other three quadrants, and the corresponding PEs have an identical EW offset from a NS mid-axis, wherein a reversal of array data about the NS mid-axis may be performed.

27. The SIMD array of claim 21, wherein the logic for the four array quadrants is configured such that each PE of a given quadrant is in proximity to corresponding PEs of the other three quadrants, and the corresponding PEs have an identical offset from an EW mid-axis, and wherein a reversal of array data about the EW mid-axis may be performed.

28. The SIMD array of claim 21, further comprising an input/output (I/O) unit configured to transfer array data using a row and column ordering that corresponds to the arrangement of PEs in the folded SIMD array.

29. The SIMD array of claim 28, further comprising a plurality of page units, wherein there is one page unit for each row of PEGs, and wherein the transfer of array data occurs via the plurality of page units.

30. The SIMD array of claim 19, comprising means to configure the east and west array half PEs so that each PE of the west half is in proximity to a corresponding PE of the east half, and corresponding PEs have an identical EW offset from a NS mid-axis, wherein a reversal of array data about the NS mid-axis may be performed.

31. The SIMD array of claim 19, comprising means to couple the east half PEs of each PEG via signals on the PEG periphery to east half PEs of the neighboring PEGs and the west half PEs of each PEG are coupled to the west half PEs of the neighboring PEGs.

32. The SIMD array of claim 19, wherein each array segment is configured to provide shifting as required by an orientation of a corresponding array half within the folded SIMD array such that a consistent logical array shift is performed by the array halves.

33. The SIMD array of claim 19, further comprising an input/output (I/O) unit configured to transfer array data using a column ordering that corresponds to the arrangement of PEs in the folded SIMD array.

* * * * *